US006694346B1

(12) United States Patent
Aman et al.

(10) Patent No.: US 6,694,346 B1
(45) Date of Patent: Feb. 17, 2004

(54) LONG RUNNING, REUSABLE, EXTENDIBLE, VIRTUAL MACHINE

(75) Inventors: Jeffrey D. Aman, Poughkeepsie, NY (US); Rajesh R. Bordawekar, Yorktown Heights, NY (US); Michael Wayne Brown, Georgetown, TX (US); Donna Ngar-Ting Dillenberger, Yorktown Heights, NY (US); David B. Emmes, Poughkeepsie, NY (US); Donald William Schmidt, Stone Ridge, NY (US); Mark Alvin Sehorne, Round Rock, TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/304,160

(22) Filed: Apr. 30, 1999

(51) Int. Cl.⁷ .................................................. G06F 9/00
(52) U.S. Cl. .......................................... 709/104; 709/1
(58) Field of Search ............................. 707/206; 709/1, 709/104, 3 R (56) References Cited

U.S. PATENT DOCUMENTS

| | | | | |
|---|---|---|---|---|
| 5,247,681 A | * | 9/1993 | Janis et al. .................. | 395/700 |
| 5,375,241 A | * | 12/1994 | Walsh ......................... | 395/700 |
| 5,999,732 A | * | 12/1999 | Bak et al. .................... | 717/148 |
| 6,167,535 A | * | 12/2000 | Foote et al. ................... | 714/38 |
| 6,332,218 B1 | * | 12/2001 | Walker et al. ............... | 717/166 |
| 6,363,409 B1 | * | 3/2002 | Hart et al. ..................... | 709/1 |

OTHER PUBLICATIONS

Klemm, "Practical Guidelines for Boosting Java Server Performance", ACM, 1999.*
Atkinson et al., Providing Orthogonal Persistence for Java Extended Abstract, Jul. 1998, LNCS 1445, pp. 383–395.*
Davis, Build your own ObjectPool in Java to bosst app speed, Jun. 1998, Java World.*
Dale Rogerson, 1997, Microsoft Press, "Inside COM —Microsoft's Component Object Model", pp. 85–100.*
Jay Munro, Jun. 1992, PC Magazine, v11, n11, p379(6), "Writing DLLs for Windows using Visual Basic, part 1".*

* cited by examiner

Primary Examiner—John Follansbee
Assistant Examiner—Diem Cao
(74) Attorney, Agent, or Firm—Ohlandt, Greeley, Ruggiero & Perle, L.L.P.; Daniel P. Morris (57) ABSTRACT

In a virtual machine environment, the invention enables creation of a long running, reusable, virtual machine are disclosed. The environment includes a shared heap where requisite runtime code to bring the virtual machine into a 'ready' mode are loaded, linked, verified, initialized and compiled. Subsequent virtual machines are started and jointly use the shared heap. Applications create their objects in 'private heaps' that are exclusively reserved for the respective applications. At the end of execution of an application, each private heap is reinitialized. Static initializers are run in a persistent area of each private heap. This persistent area is reset to its initial values in between execution of applications. This obviates the need to terminate the virtual machine.

24 Claims, 6 Drawing Sheets

(RUN ONCE)

```
┌─────────────────────────────────────────────┐
│ ALLOCATE A SHARED HEAP FOR USE BY THE       │
│ MULTIPLE APPLICATION PROGRAMS, THE SHARED   │
│ HEAP ACCESSIBLE BY THE MULTIPLE             │
│ APPLICATION PROGRAMS.                       │
└─────────────────────────────────────────────┘
                      │
                      ▼
┌─────────────────────────────────────────────┐
│ STORE IN THE SHARED HEAP, NON-APPLICATION   │
│ PROGRAM-SPECIFIC DATA THAT IS USED TO       │
│ CONTROL RUNTIME OPERATIONS OF               │
│ SAID COMPUTER.                              │
└─────────────────────────────────────────────┘
                      │
                      ▼
┌─────────────────────────────────────────────┐
│ ALLOCATE A PRIVATE HEAP TO EACH RESPECTIVE  │
│ APPLICATION PROGRAM OF MULTIPLE APPLICATION │
│ PROGRAMS, EACH PRIVATE HEAP INCLUDING A     │
│ PERSISTENT PORTION THAT INCLUDES STATIC     │
│ INITIALIZER VALUES, AND A RESETTABLE PORTION.│
└─────────────────────────────────────────────┘
                      │
                      ▼
┌─────────────────────────────────────────────┐
│ STORE IN EACH PRIVATE HEAP, APPLICATION     │
│ PROGRAM-SPECIFIC DATA FOR THE RESPECTIVE    │
│ APPLICATION PROGRAM WITH WHICH EACH PRIVATE │
│ HEAP IS ASSOCIATED.                         │
└─────────────────────────────────────────────┘
                      │
                      ▼
```

FIG. 6a (RUN FOR EACH APPLICATION)

CONTROL EACH APPLICATION PROGRAM TO STORE APPLICATION PROGRAM-RELATED DATACODE IN ASSOCIATED PRIVATE HEAPS SO AS TO PROVIDE ISOLATION BETWEEN APPLICATION DATA AND TO STORE IN THE PRIVATE HEAP, NON-APPLICATION PROGRAM-SPECIFIC CODE THAT IS REQUIRED FOR MODIFICATION OF RUNTIME OPERATIONS OF THE COMPUTER TO ALLOW SUCCESSFUL EXECUTION OF AN APPLICATION.

RESET TO INITIAL STATE, VALUES STORED IN AN ASSOCIATED PRIVATE HEAP UPON COMPLETION OF EXECUTION OF AN APPLICATION PROGRAM, THE RESETTING ENTERING INITIATING STATIC INITIALIZER VALUES INTO THE PERSISTENT PORTION AND A COMMON INITIAL VALUE INTO THE RESETTABLE PORTION.

RETAIN CONTENTS OF THE SHARED HEAP FOR SUBSEQUENT USE, TO ENABLE CODE STORED IN THE SHARED HEAP TO BE REUSED.

RETAIN DATA WHICH DEFINES THE VIRTUAL MACHINE FOR USE BY A SUBSEQUENT APPLICATION PROGRAM.

FIG.6b

LONG RUNNING, REUSABLE, EXTENDIBLE, VIRTUAL MACHINE

FIELD OF THE INVENTION

The present invention relates to virtual data Processing machines and, in particular, to a method and apparatus for enabling such virtual data Processing machines to keep their state across invocations, to amortize initialization and runtime costs, to avoid garbage collection and Process termination and to provide greater application security, isolation and availability.

BACKGROUND OF THE INVENTION

Virtual machines are created within a Process for the purpose of loading and running an application. As is known, a "Process" isolates resources that are allocated to a particular program during runtime and prevents multiple programs from interfering with each other's execution. At the termination of execution of an application program, the entire Process is torn down.

As virtual machine applications increase, it is desirable to retain the virtual machine so as to enable it to execute a next application program. This can save the expensive costs of Process tear down and start up. For example, prior art computer systems may need to execute between 5 million and 40 million lines of code to reestablish a virtual machine and a Process. Having a long running, reusable virtual machine also saves the cost of class linking, loading and initialization which are also expensive in terms of use of computational facilities. Avoiding the creation of a virtual machine environment, per application, also increases the volume and throughput of applications a system can manage.

Currently, virtual machines are uniProcess and begin and end when the application completes. The prior art has suggested various ways to keep the state of a virtual machine in existence. One suggested solution is to maintain a pool of virtual machine Processes. Another is to "check point" a virtual machine's state (i.e., to retain for subsequent use a copy of all machine values that the machine has set). A further solution is to maintain a pool of virtual machines and to send objects created in one virtual machine to the "heap" (i.e., an allocated area of memory) of another virtual machine.

Maintaining a pool of virtual machines does not diminish an initialization path length of a virtual machine. Scheduling of application programs in a previously created virtual machine hides the path length from a client request, but does not reduce class linking, loading or initialization requirements nor does it obviate a need to bring up and tear down a Process for each application.

Check pointing a virtual machine's state and applying it to new Processes requires pointer and offset readjustments that are costly in path length and may not be possible in systems where a range of addresses a Process will command cannot be guaranteed.

Reuse of a same virtual machine Process for multiple applications does not guarantee a clean heap nor a writable static area of memory (i.e., predefined fields with assigned integer values) for each application that runs consecutively in the virtual machine.

Maintaining a pool of virtual machines and "function shipping" an application program to a correct virtual machine or sending the correct object to the virtual machine (where the application is running) requires a cache coherency scheme, incurs extra overhead and possibly network flows to pass the application or object. Moreover, this procedure does not guarantee that the memory space in each virtual machine is devoid of values left by previous applications.

Accordingly, it is an object of the present invention to provide a long running, reusable, extensible, virtual machine to run application programs.

Another object of the present invention is to obviate the need to tear down and bring up a new virtual machine to insure that dynamic or static memory values set by a previous application program are no longer present.

Yet another object of the present invention is to initialize a virtual machine once and to reuse this initialization state across subsequent virtual machine Processes.

A further object of the present invention is to load, link, verify, and compile a class once and to reuse this class data across subsequent virtual machine Processes.

A still further object of the present invention is to invoke the initialization methods of a class once and to reuse this class data across subsequent virtual machine Processes.

Yet another object of the present invention is to be able to run multiple applications in a long running virtual machine and have each application isolated from each other, increasing the availability of the virtual machine.

Still another object of the present invention is to separate a virtual machine's state into different heaps: private and shared, which enable application isolation, more efficient garbage collection and an ability to extend the virtual machine's runtime.

Another object of the present invention is to obviate the need for garbage collection on a virtual machine's private state.

SUMMARY OF THE INVENTION

An architecture for a virtual machine which can be persistent through multiple applications includes a shared heap where requisite runtime classes to bring the virtual machine into a 'ready' mode are loaded, linked, verified, initialized and compiled. Subsequent virtual machines are started and use the contents of the shared heap where the necessary system classes have already been loaded and initialized. Application lasses are loaded into the shared heap, allowing subsequent applications to reuse these classes without the cost of reloading. relinking, reverifying and recompiling the classes. Application programs create their objects in "private heaps". At the end of execution of the application, the private heap is reinitialized. No garbage collection (i.e., a method for finding unused memory) need occur on the private heap.

Static initializers are methods that create predefined values (hereafter "static values") that are maintained in a persistent area of the private heap. This persistent area is is not reset to a common value, but rather is reset to its initial values, between execution of applications. This action obviates the need to terminate the virtual machine Process. If applications "misbehave" (i.e. open or create external Process related resources, e.g., threads, file descriptors, etc.), the virtual machine Process is terminated to insure complete clean up of those resources. However, the shared heap is not deleted and can be used by subsequent virtual machines. These subsequent virtual machines save the overhead of reloading, relinking, recompiling, reverifying any of the classes needed for runtime initialization or any of the application classes that have been used previously.

This architecture has the effect of a long running, reusable, virtual machine, because classes, once loaded, need not be loaded or initialized again.

BRIEF DESCRIPTION OF THE DRAWINGS

The above objects and advantages of the present invention will become more apparent by description of preferred embodiments thereof, with reference to the attached drawings in which.

DETAILED DESCRIPTION OF THE INVENTION

The present invention is directed to a virtual machine that includes a set of functions that behave in a consistent manner regardless of the hardware or operating system on which the virtual machine is running. Applications running in a virtual machine, therefore, need not be aware of any operating system or platform inconsistencies or unique functionalities. To share functions (i.e., the runtime of the virtual machine) and any new functions loaded by the application, memory is delineated into a shared heap and private heap. A private heap is an area of memory exclusively allocated to one application. A shared heap is an area of memory that is accessible by two or more applications.

Figure 1:
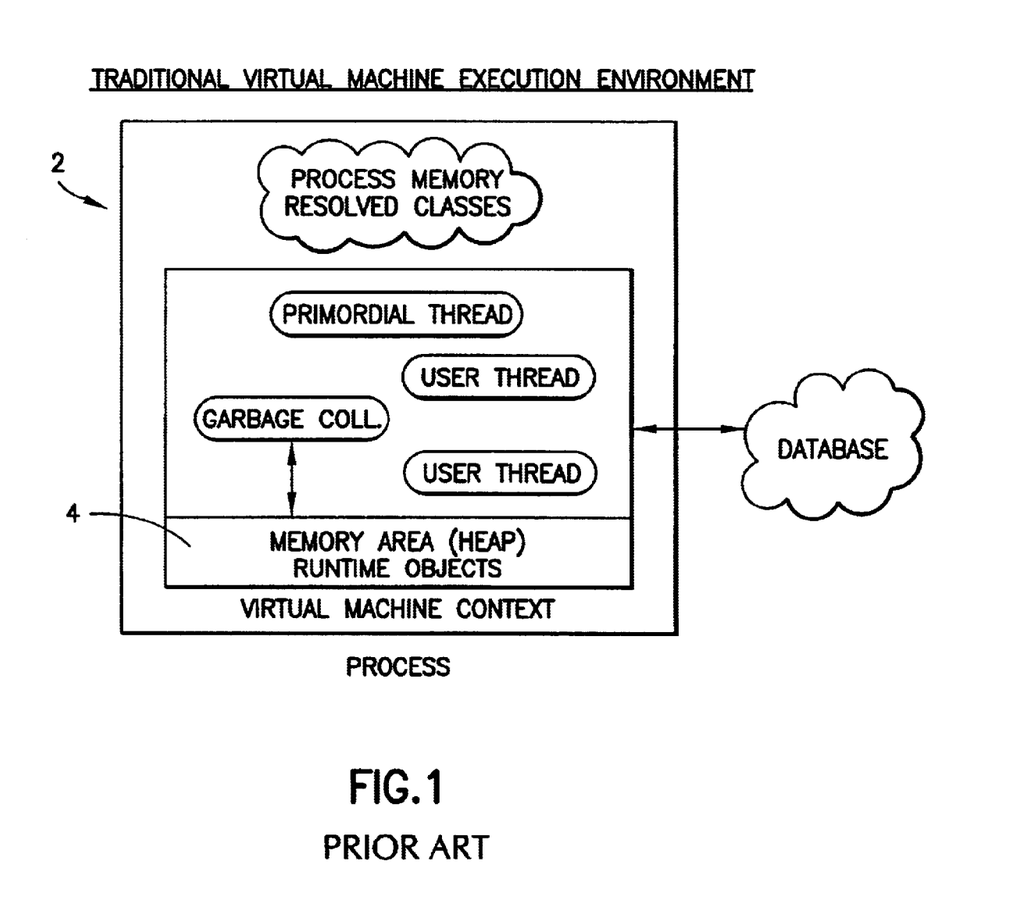
FIG. 1 shows a prior art virtual machine.

FIG. 1 shows a schematic of a prior art virtual machine 2. There is one heap 4 and all applications run in the same Process (i.e., only one application at a time can run in the Process). The drawbacks of this design are that there is currently no method to reinitialize the heap other than to terminate the entire Process and bring up a new Process. Any user thread (e.g., a current state of a procedure) running in the Process may corrupt or cause a failure of other user threads or other user threads' data. Garbage collection is required to recover free space in single heap 4 for allocation of runtime objects. There is no sharing or amortization of class loading and linking between multiple virtual machine Processes. There is no sharing or amortization of virtual machine initialization between multiple virtual machine Processes.

Figure 2:
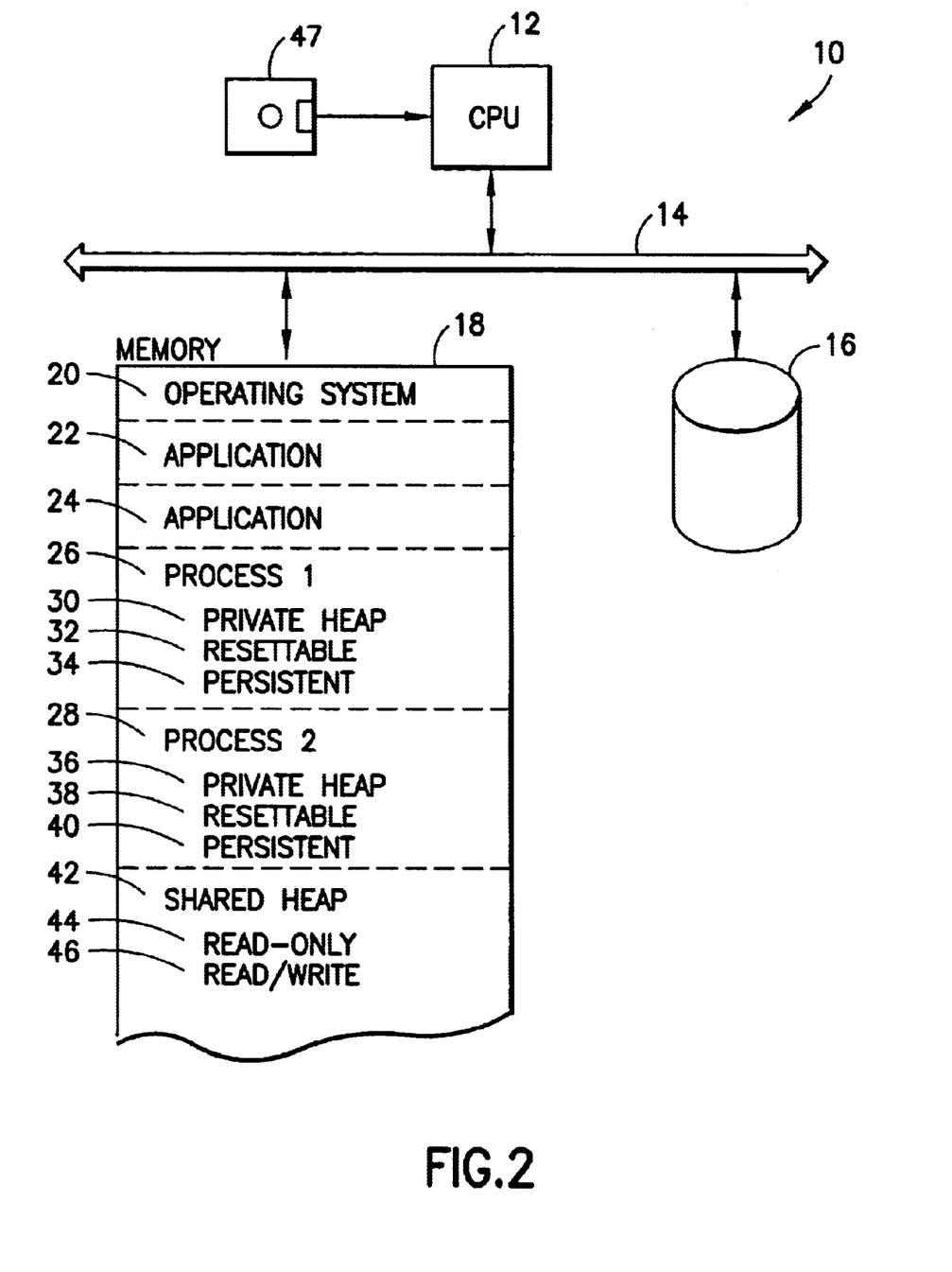
FIG. 2 is a block diagram of a computer system for carrying out the invention.

FIG. 2 illustrates a block diagram of a computer system 10 for carrying out the invention. A central Processing unit (CPU) 12 controls, via bus system 14, the overall operation of system 10 in conjunction data and programs stored on disk drive 16 and data and programs stored in memory 18. An operating system 20 controls the operation of CPU 12 and execution of various procedures, to be hereafter described.

A pair of applications 22 and 24 are resident in memory 18, as are Processes 26 and 28 that are respectively associated therewith. Each Process allocates a region of memory 18 for use as a private heap. Thus, application 22 is associated with private heap 30 which, in turn, is comprised of a resettable portion 32 and a persistent portion 34. Resettable portion 32 is used to store application specific code, whereas persistent portion 34 stores static values, i.e., predefined values used to bring an application program to an initial state. In similar fashion, application 24 is associated with private heap 36 comprising a resettable portion 38 and a persistent portion 40.

Also resident in memory 18 is a shared heap 42 which includes a read-only portion 44 and a read/write portion 46. Read-only portion 44 is used to store non-application specific code (e.g., run-time classes) and read/write portion provides an area of memory that either application 22 or 24 can read from or write to, using suitable lock protection to avoid conflicts. Private heap 30 can only be accessed by application 22, and private heap 36 by application 24, however, shared heap 42 is accessible by both applications 22 and 24.

Hereafter it will be assumed that all of the necessary programs are loaded into memory and are ready for execution. It is to be understood, however, that such programs can be incorporated into a memory device 47 that can be selectively loaded into system 10 on an as-needed basis.

Figure 3:
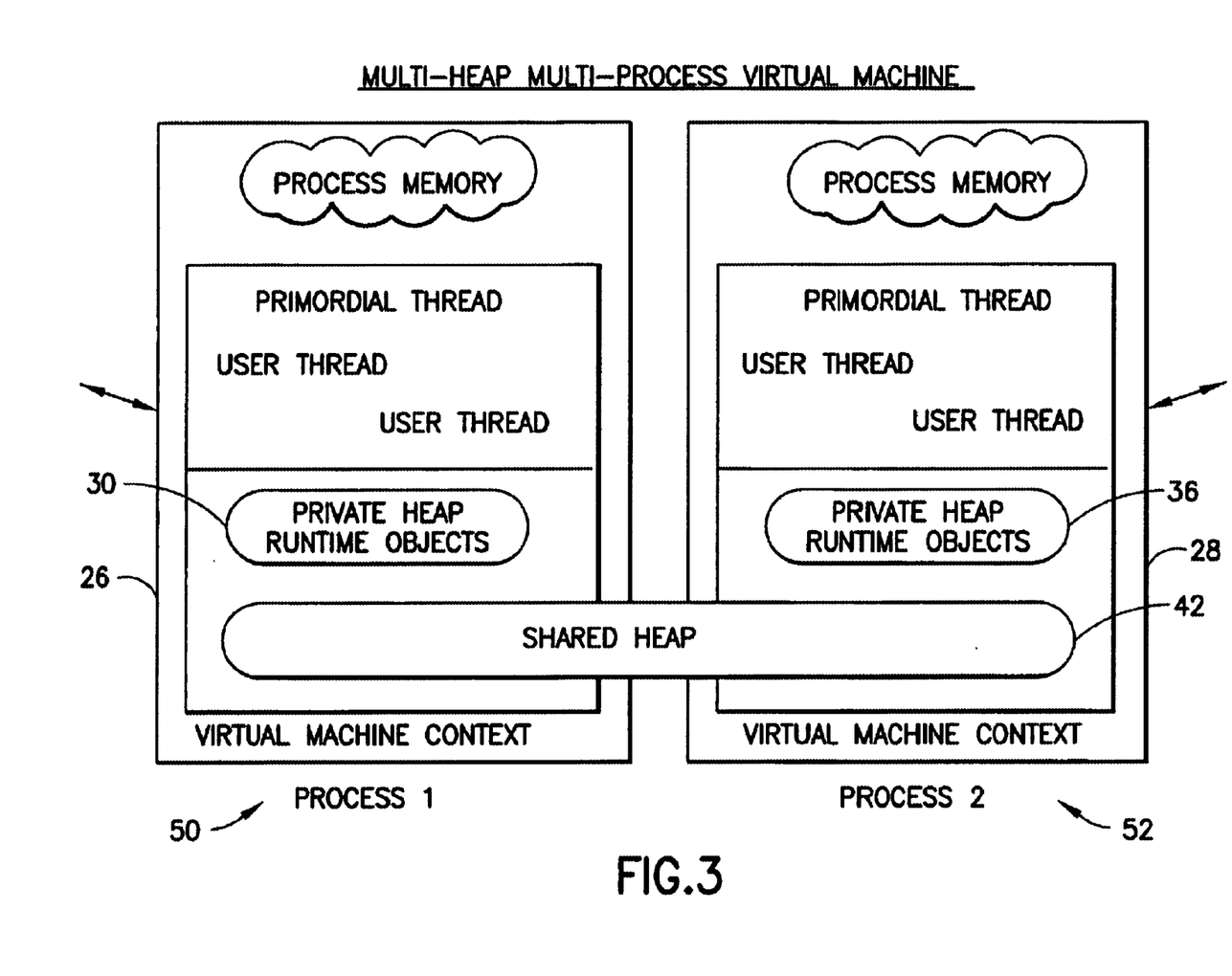
FIG. 3 shows a virtual machine that is configured by the system of FIG. 2 with private and shared heaps.

FIG. 3 schematically depicts virtual machines 50 and 52, with a shared heap 42 and private heaps 30 and 36. Process 26 is running on virtual machine 50 and process 28 is running on virtual machine 52. Runtime classes are loaded and linked into shared heap 42 and are thus able to be used by virtual machines 50 and 52. This obviates the need for subsequent virtual machines to re-load, re-link, re-verify and re-initialize system classes required for initialization and classes required for applications. Each private heap 30, 36 is used to store object instances that are specific to an application to be executed by the virtual machine. The private heap separation allows greater availability and isolation between data used and created by the different applications.

Garbage collection need not be invoked on the private heaps. At the end of execution of an application, the associated private heap is reset to its initial state. A virtual machine may terminate due to a "misbehaved" application (i.e., one associated with an external resource), but shared heap 42 remains available to subsequent virtual machines. This provides the functionality of a long running, reusable virtual machine.

Applications are further isolated from each other at the Process boundary. Not only is their data stored in separate private heaps, but the writable areas are separate that hold static values and any Process—related resources (e.g. file descriptors, data base connections). This Process isolation provides higher availability and scalability.

Figure 4:
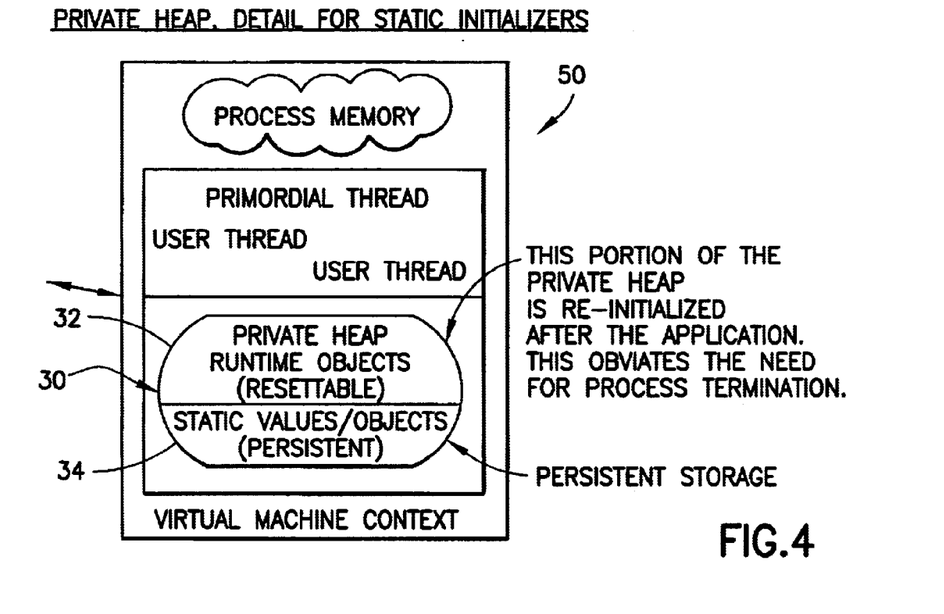
FIG. 4 shows a private heap in closer detail for explanation of the reuse of values created during class initialization.

FIG. 4 provides greater detail of private heap area 30 in virtual machine 50(for example). Runtime objects created by an application are stored in private heap 30, as well as objects and values created by static initialization methods. Private heap 30 is divided into two areas, a persistent area 34 that holds the objects and values created by static initialization methods and a resettable area 32 where application objects are created (i.e. objects created by non static initializer code).

In an ordinary virtual machine, the static initializer code for a given class runs once. Since the static initializer code represents application code, it is capable of doing almost anything an application program can do. For example, it may invoke methods in other classes, create objects, and set static variables in its class (or other classes provided it has proper access authority). Once work requests start running, they may also update the static variables, or may update object fields which are anchored by static variables.

Other virtual machine instances running application code perceive that they are running in their own dedicated virtual machine and should not be affected by other virtual machine instances. In order to preserve this illusion, each virtual machine must logically be given its own "copy" of the static variables. Once a virtual machine updates a static variable, it must have a separate physical copy for its own use.

Accordingly, separate physical copies are assigned, either when the virtual machine initializes (for those classes already loaded) or once work requests start running and a new class is loaded by the virtual machine instance. Thus, each virtual machine has its own copy of each static non-final variable to update as it sees fit. However the "initial" value of each such static variable will first be replicated upon return from a static initializer routine in a backup array, so that the next work request may start with static variables set to their "initial" values.

This is straightforward for static variables that are integers (or similar fullword types). However, a static variable may also be an object or array reference, in which case the initial value of the data must be captured for the object or array itself. Since the runtime routine does not know whether an object or array allocated by a static initializer routine will, in fact, be referenced by a static variable, it must presume the worst and assume that this will happen. Thus all objects or arrays allocated by a static initializer routine are allocated (when space permits) from the persistent area 34 for static data within private heap 30.

The new static data is replicated upon completion of the static initializer routine, to a backup area. When each work request completes, this backup area is used to refresh the objects and arrays within the persistent data area of the private heap.

However, a challenge this presents is that it cannot be known in advance how much space will be required for the static data related to application classes. Note, that this can be known for the system classes which are loaded into shared heap 42. The solution is to use persistent storage area 34 for the virtual machine runtime routine so as to track how much static data has been used at any given point.

The very first time a task creates its private heap, the allocated storage area for private heap 34 is cleared and the size of the storage area is passed as an input to the virtual machine creation method. Any time a work request causes the Process to terminate, the subsystem recreates the virtual machine, passing the size of the persistent storage area. When the application has potentially left resources behind (e.g. threads, open files, storage, etc.) the virtual machine runtime Process forces Process termination.

Persistent area 34 in private heap 30 obviates the need to rerun static initializers. Area 32 in private heap 30 is non persistent. Non persistent area 32 holds application data objects that are not required beyond the life of the application. At the end of the application, if Process termination is not necessary (i.e., the application is well behaved), the entirety of private heap 30 is reinitialized. Resettable area 32 is set to a "clean" value (e.g., =0) and persistent area 34 is set to the initial static initializer values. In this general case, this obviates the need to run garbage collection for an application's private data. For well behaved applications, the use of private heap 30 obviates the need for Process termination to ensure that no values remain from previous applications and obviates the need to rerun static initializers for each application.

Figure 5:
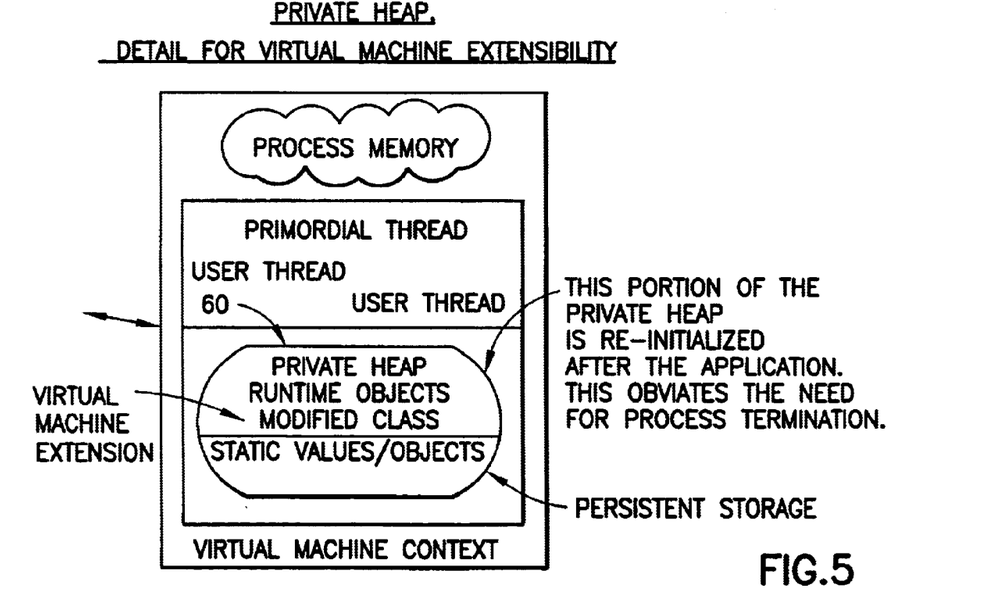
FIG. 5 shows a private heap in closer detail for an explanation of loading system or application classes that have been modified.

FIG. 5 provides greater detail of a private heap 60 when used to extend an application's virtual machine environment. For system or application classes that have been modified to tailor a specific application, platform or function, the loading, linking, verifying, and compiling of those classes into private heap 60 extends the virtual machine environment for that one application. The insertion of the modified classes into private heap 60 enables a tailored runtime. Further, it eliminates the need to rebuild, reload, relink, recompile the complete set of classes that compose a virtual machine's runtime routine (stored in the shared heap). Only the one class (or classes) need be modified and placed into the private heap.

Figure 6A:
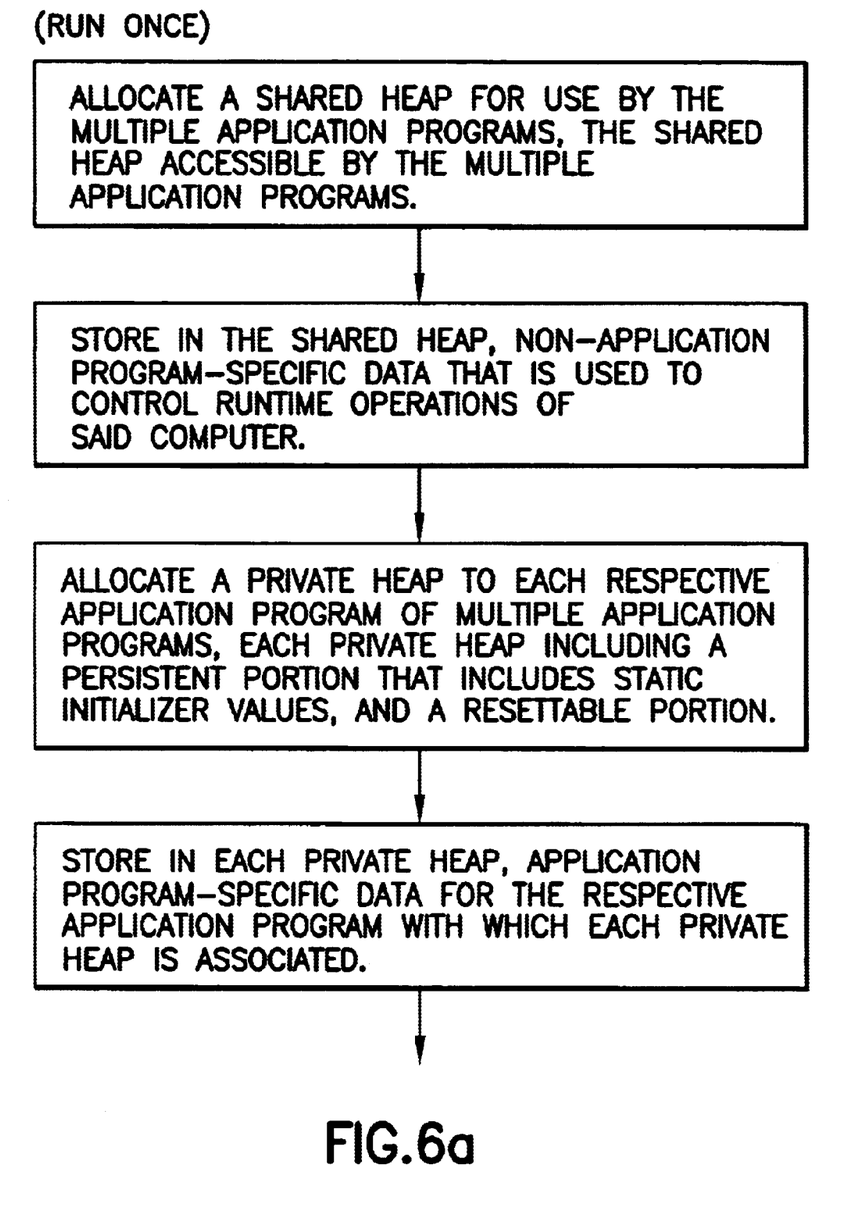
FIGS. 6a and 6b comprise a flow diagram that illustrates the operation of the invention.
Figure 6B:
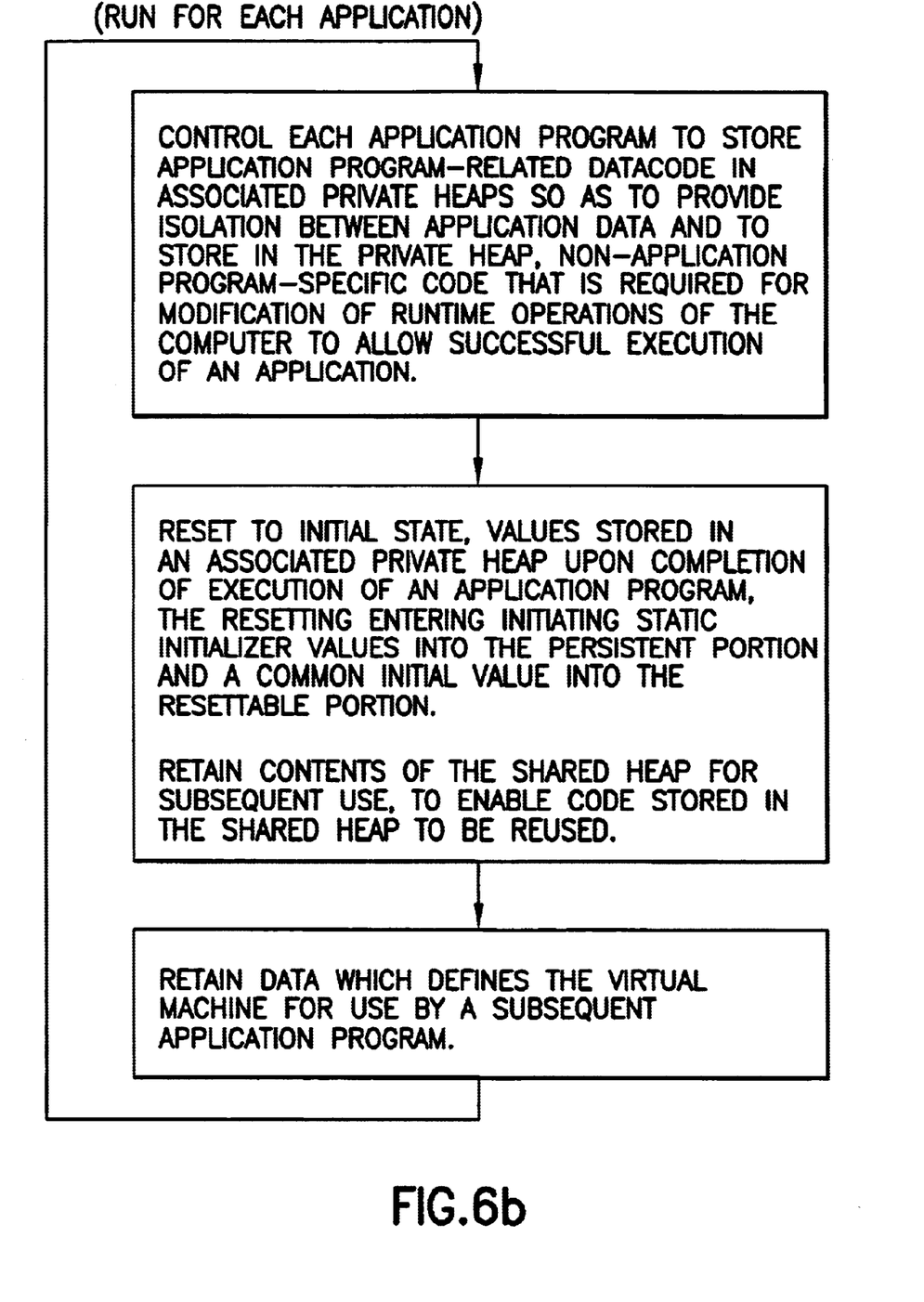

FIGS. 6a and 6b comprise a flow diagram that illustrate the steps of the method of the invention as they have been described above.

While the invention has been particularly shown and described with respect to illustrative and preferred embodiments thereof, it will be understood by those skilled in the art that the foregoing and other changes in form and details may be made therein without departing from the spirit and scope of the invention which should be limited only by the scope of the appended claims.

What is claimed is:

1. A method for providing in a computer, a virtual data Processing entity that is re-usable by multiple application programs that run on said computer, said method comprising:

allocating a shared heap to which said multiple application programs write data;

storing in said shared heap, non-application program-specific code that is used to control runtime operations of said computer;

allocating a private heap to each respective application program of said multiple application programs, said private heap having an area of memory reserved for exclusive use by the respective application program;

storing in each said private heap application program-specific data for the respective application program with which each said private heap is associated;

resetting to an initial state, values stored in an associated private heap upon completion of execution of an application program, and retaining contents of said shared heap for subsequent use, thereby enabling said non-application program-specific code stored in said shared heap to be reused without a need for a relinking, re-verification, recompilation or reloading thereof; and retaining data which defines said virtual data Processing entity for use by a subsequent application program.

2. The method as recited in claim 1, wherein each said private heap includes a persistent portion that includes static initializer values, said resetting step re-creating said initial state by entering initiating static initializer values thereinto.

3. The method as recited in claim 2, wherein each said private heap includes a resettable portion whose initial state is a common value.

4. The method as recited in claim 1, further comprising the step of:

controlling each application program to store application program-related code in associated private heaps so as to provide isolation between application data.

5. The method as recited in claim 1, further comprising the step of:

storing in said private heap, non-application program-specific code that is required for modification of runtime operations of said computer to allow successful execution of an application.

6. The method as recited in claim 5, wherein each said private heap includes a resettable portion whose initial state is a common value and said non- application specific code that is required for modification of runtime operations is stored therein.

7. The method of claim 1, wherein said shared heap is accessible by a plurality of processes.

8. A memory media for providing in a computer, a virtual data Processing entity that is re-usable by multiple application programs that run on said computer, said memory media comprising:
   a) means for controlling said computer to allocate a shared heap to which said multiple application programs write data;
   b) means for controlling said computer to store in said shared heap, non-application program-specific code that is used to control runtime operations of said computer;
   c) means for controlling said computer to allocate a private heap to each respective application program of said multiple application programs, said private heap having an area of memory reserved for exclusive use by the respective application program;
   d) means for controlling said computer to store in each said private heap application program-specific data for the respective application program with which each said private heap is associated;
   e) means for controlling said computer to reset to an initial state, values stored in an associated private heap upon completion of execution of an application program, and to retain contents of said shared heap for subsequent use, thereby enabling said non-application program-specific code stored in said shared heap to be reused without a need for a relinking, re-verification, recompilation or reloading thereof; and
   f) means for controlling said computer to retain data which defines said virtual data Processing entity for use by a subsequent application program.

9. The memory media as recited in claim 8, wherein each said private heap includes a persistent portion that includes static initializer values, said means e) controlling said computer to re-create said initial state by entering initiating static initializer values thereinto.

10. The memory media as recited in claim 9, wherein each said private heap includes a resettable portion whose initial state is a common value.

11. The memory media as recited in claim 8, further comprising:
   g) means for controlling said computer to control each application program to store application program-related code in associated private heaps so as to provide isolation between application data.

12. The memory media as recited in claim 8, further comprising:
   g) means for controlling said computer to store in said private heap, non-application program-specific code that is required for modification of runtime operations of said computer to allow successful execution of an application.

13. The memory media as recited in claim 12, wherein each said private heap includes a resettable portion whose initial state is a common value and said non-application specific code that is required for modification of runtime operations is stored therein.

14. A system for providing in a computer, a virtual data Processing entity that is re-usable by multiple application programs that run on said computer, said system including a central Processing unit (CPU) a random access memory (RAM) and code stored in said RAM for controlling operation of said CPU, said system comprising:
   means for allocating a shared heap to which said multiple application programs write data;
   means for storing in said shared heap, non-application program-specific code that is used to control runtime operations of said computer;
   means for allocating a private heap to each respective application program of said multiple application programs, said private heap having an area of memory reserved for exclusive use by the respective application program;
   means for storing in each said private heap application program-specific data for the respective application program with which each said private heap is associated;
   means for resetting to an initial state, values stored in an associated private heap upon completion of execution of an application program, and retaining contents of said shared heap for subsequent use, thereby enabling said non-application program-specific code stored in said shared heap to be reused without a need for a relinking, re-verification, recompilation or reloading thereof; and
   means for retaining data which defines said virtual data Processing entity for use by-a subsequent application program.

15. The system as recited in claim 14, wherein each said private heap includes a persistent portion that includes static initializer values, said means for resetting re-creates said initial state by entering initiating static initializer values thereinto.

16. The system as recited in claim 15, wherein each said private heap includes a resettable portion whose initial state is a common value.

17. The system as recited in claim 14, further comprising:
   means for controlling each application program to store application program-related code in associated private heaps so as to provide isolation between application data.

18. The system as recited in claim 14, further comprising:
   means for storing in said private heap, non-application program-specific code that is required for modification of runtime operations of said computer to allow successful execution of an application.

19. The system as recited in claim 18, wherein each said private heap includes a resettable portion whose initial state is a common value and said non-application specific code that is required for modification of runtime operations is stored therein.

20. A method for providing in a computer, a re-usable virtual data processing entity, said method comprising:
   allocating a heap, in response to an invocation of a virtual machine, said heap having a persistent portion for storing static initializer values for said virtual machine, and a resettable portion for storing variables that define a state of said virtual machine; and
   retaining said static initializer values in said persistent portion for use during a subsequent invocation of said virtual machine.

21. The method of claim 20, wherein said resettable portion is not subject to a garbage collection process.

22. The method of claim 20,
   wherein said static initializer values are set to an initial state by an initializer routine when a first application invokes said virtual machine, and
   wherein said static initializer values are reset to said initial state, without executing said initializer routine, when a second application invokes said virtual machine.

23. A system for providing in a computer, a re-usable virtual data processing entity, said system comprising:

a heap, allocated in response to an invocation of a virtual machine, said heap having a persistent portion for storing static initializer values for said virtual machine, and a resettable portion for storing variables that define a state of said virtual machine, wherein said static initializer values are retained in said persistent portion for use during a subsequent invocation of said virtual machine.

24. A memory media for providing in a computer, a re-usable virtual data processing entity, said memory media comprising:

means for controlling said computer to allocate a heap, in response to an invocation of a virtual machine, said heap having a persistent portion for storing static initializer values for said virtual machine, and a resettable portion for storing variables that define a state of said virtual machine, wherein said static initializer values are retained in said persistent portion for use during a subsequent invocation of said virtual machine.

* * * * *